J. F. PETERS.
POLYPHASE CURRENT LIMITING REACTANCE COIL.
APPLICATION FILED JULY 3, 1914.
1,204,377.
Patented Nov. 7, 1916.
2 SHEETS—SHEET 1.
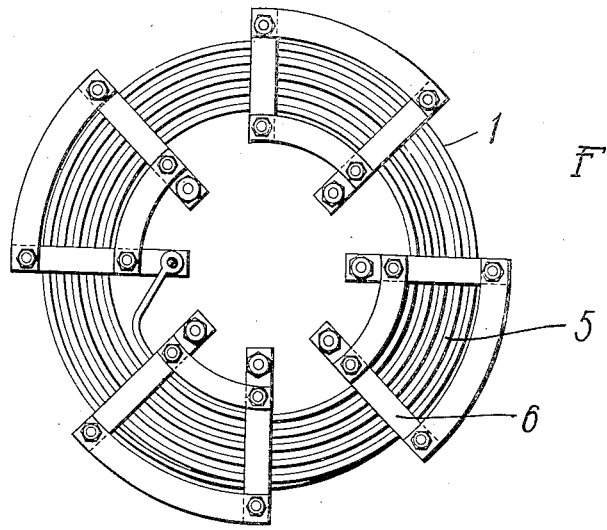
Fig. 2.
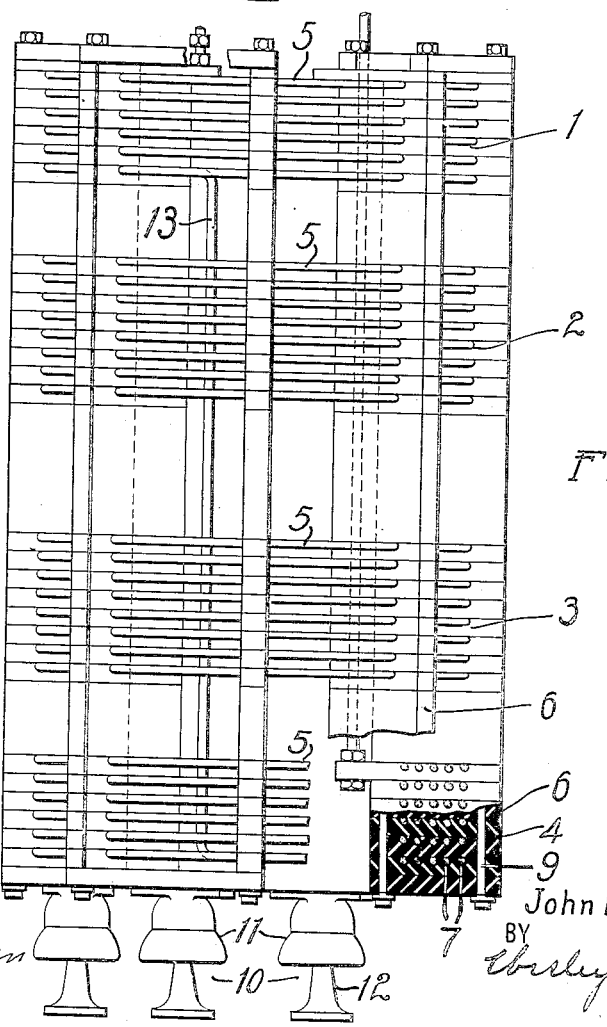
Fig. 3.
Fig. 1.
WITNESSES:
R. J. Fitzgerald
Geo. W. Hansen
INVENTOR
John F. Peters.
BY
Charles E. Carr
ATTORNEY

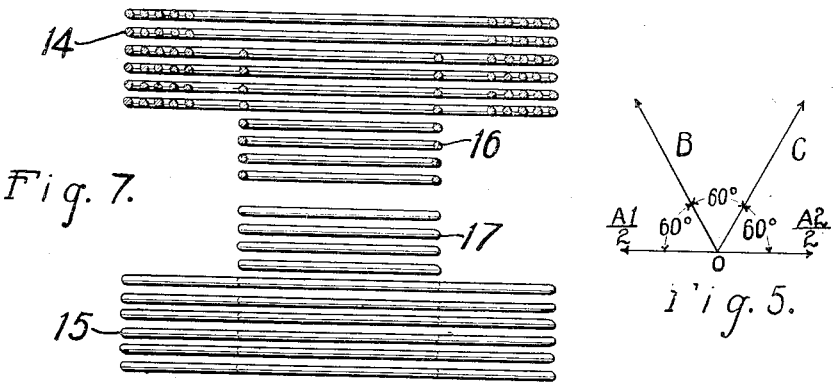
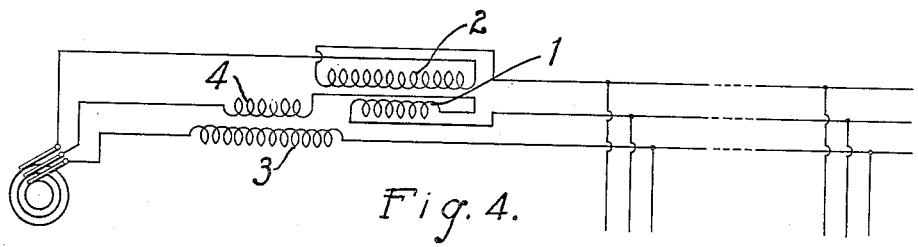
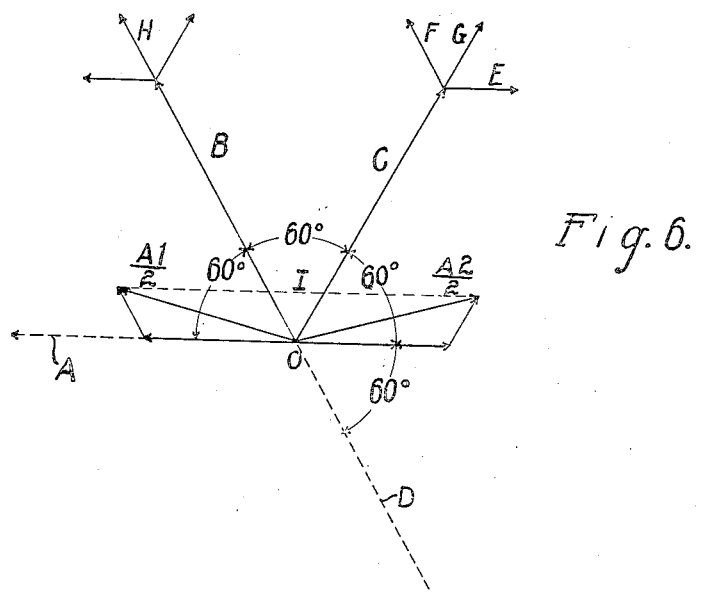

UNITED STATES PATENT OFFICE.

JOHN F. PETERS, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

POLYPHASE-CURRENT-LIMITING REACTANCE-COIL.

1,204,377.  Specification of Letters Patent.  Patented Nov. 7, 1916.

Application filed July 3, 1914. Serial No. 848,794.

*To all whom it may concern:*

Be it known that I, JOHN F. PETERS, a citizen of the United States, and a resident of Edgewood Park, in the county of Allegheny and State of Pennsylvania, have invented a new and useful Improvement in Polyphase-Current-Limiting Reactance-Coils, of which the following is a specification.

My invention relates to current-limiting reactances, and particularly to reactances which are adapted to be inserted in polyphase circuits as protective means for electrical apparatus connected therein.

When a short circuit occurs upon one or more of the feeders or distributing lines of a power system, each of the generators supplying power to the main feeder buses is required to furnish momentarily an abnormal load until the circuit breakers associated with the affected feeder have had time to open and thereby disconnect it from the buses, or until the speed of the generators has sufficiently decreased to prevent further current flow of an abnormal value. Inasmuch as large-capacity, high-speed alternators of the usual type have low internal reactances, severe damage may result to these generators upon the occurrence of short circuits. A short-circuit current of from 30 to 40 times full-load current is not uncommon, and such quantities of current flowing in the windings of a generator may cause serious damage to the copper conductors, and distortion and displacement of the coils. In order to limit the value of the momentary short-circuit current to a safe value, that will not cause damage to the generator or seriously affect the continuity of service, a current-limiting reactance is inserted in the circuit. This reactance may be inserted by adding an external power-limiting reactance device or by so designing the generator as to increase its self-inductive reactance, or by combining both of the above-mentioned means for increasing the reactance of the circuit.

My invention refers to power-limiting reactance devices only that are external to the apparatus to which they afford protection.

Heretofore, in polyphase power systems, and particularly in three-phase systems, it has been necessary to insert a reactance coil comprising a single unit in each conductor of the system. The separate coils were spaced apart and grouped either in equilateral formation or in a straight line to minimize and balance the mutual effects between the several coils during short circuits. Inasmuch as each reactance coil was depended upon to limit, to a safe value, the short-circuit current flowing in its associated conductor, it was necessary to make the coil of adequate size. Again, the coils, being spaced apart substantially large distances from one another, required considerable floor space for their proper installation.

By means of my invention, I superpose the coils upon one another and connect them in circuit in such a manner as to utilize their mutual electromagnetic inductive effects and thereby materially reduce the size of the coils.

Another advantage accruing from the use of my invention is a reduction in the amount of floor space required. This is accomplished by the method I employ for assembling the coils with respect to one another. Again, in utilizing my invention, the cost of adequately protecting the generating equipment of power systems is greatly reduced without decreasing the effectiveness or reliability of the protection afforded.

In order to understand my invention more fully, reference may be had to the following description and the accompanying drawing in which—

Figure 1 is a side view, partially in section, of a three-phase reactance coil constructed in accordance with my invention; Fig. 2 is a plan view of the coil shown in Fig. 1; Fig. 3 is a diagrammatic view showing the electrical connections of the coils; Fig. 4 is a diagrammatic representation of a power-distributing system in which my reactance coil is connected in circuit; Fig. 5 is a vector diagram of the induced electromotive forces obtaining in my coil; Fig. 6 is another vector diagram showing, in detail, the induced electromotive forces in my coil, and Fig. 7 is a side view, partially in section, of a modification of the coil shown in Fig. 1.

Referring to Figs. 1 and 2, a plurality of reactance coils 1, 2, 3 and 4, each comprising a group of flat spirals 5 (shown in Fig. 2), are superposed upon, and spaced from, one another, substantially as shown in Fig. 1. Radially extending cleats 6, provided with recesses 7 formed on one face thereof, receive the conductors 8. The cleats 6 brace the coils against the internal mechanical stresses set up when heavy short-circuit currents flow through the coils and they also space the various convolutions or turns from one another, thereby greatly facilitating the ventilation of the coil. Longitudinally extending tie-bolts 9 projecting through openings in the extremities of the cleats 6, hold the coils in fixed relation to one another and brace the spirals against the external mutual stresses existing therebetween. Insulating supports 10, comprising porcelain insulators 11 and feet 12 associated therewith, prevent the coil from grounding on the bed plate or floor upon which they may be positioned.

Inasmuch as it is desirable for power-limiting reactance coils to offer minimum reactance to the load currents and considerable reactance to short-circuit or abnormally large currents, it is usual to provide non-magnetizable cores for the coils. Air cores or cores of non-magnetizable material which will impart straight-line characteristics to the coils are usually preferred. Under certain conditions, it may be more economical to provide iron cores for reactance coils of substantially high impedance. However, I prefer to use air cores when possible to do so, and, therefore, have shown my structure so provided. Air cores greatly assist in ventilating the coils and in rapidly dissipating the generated heat, in addition to greatly decreasing the total weight of the coils. Moreover, I have shown in the figures, coils wound with single conductors. But, when the currents are of such a value as to preclude the use of a comparatively small-diameter conductor, I desire to use a plurality of copper strands connected in parallel relation, in order to facilitate the winding operation.

In a polyphase or three-phase reactance coil, it is desirable to insert an equal reactance in each phase in order to preclude the unbalancing of the electromotive forces or other electrical conditions. Therefore, to obtain the most desirable results, the coil should be of such a character that the impressed electromotive forces upon the distributing mains shall be, at all times, equal in value and 120 degrees apart in phase relationship.

As hereinbefore mentioned, I greatly economize in the amount of copper used in my coil and in the floor space required for its proper installation. These results are obtained by so disposing the coils inserted in series relation in each conductor as to utilize the mutual inductive effects between the coil units.

Referring to Fig. 3, the top coil 1 and the bottom coil 4 are connected in series relationship by means of a conductor 13 which extends longitudinally in the opening of the coils, as shown in Fig. 1. The arrows indicate that the coils 1 and 4 are so connected as to cause the instantaneous current to flow in opposite directions. The coil 2, which is placed immediately below coil 1 and spaced therefrom a certain predetermined distance, is so connected in circuit with one of the conductors of the distributing system as to create a current flow in the direction indicated by the arrows. Coil 3, which is disposed intermediate coils 2 and 4 and spaced predetermined distances from each of them, is connected in series circuit with another conductor of the power system in such a manner as to create an instantaneous current flow therethrough in the direction indicated by the arrows. The resultant electromotive force induced in coil 1 results from the self inductance of the coil 1 and the mutual inductance between the coils 1 and 2, which are adjacently disposed. Correspondingly, the resultant electromotive force induced in the coil 4 is the resultant of its self induced electromotive force and the mutual inductive electromotive force resulting from the coil 3 being disposed adjacent to the coil 4. Similarly, the resultant electromotive forces induced in the coils 2 and 3 have, as their components, the self induced electromotive force of the respective coils and the mutual inductive electromotive forces from the coils 1 and 4, respectively. Inasmuch as the coils 1 and 4 are separated from each other a considerable distance, the mutual inductive effect between these coils is negligible and, therefore, will not be considered as contributing to the resultant electromotive forces. Moreover, the sum of the turns comprising the coils 1 and 4 is greater than the number of turns of either of the coils 2 and 3, but the self induction of each of said coils 1 and 4 is lower because of their being spaced apart from each other such a distance.

In Fig. 5, the vector C represents the self-induced electromotive force in coil 3. Ordinarily, the self-induced electromotive force in the coil 2 would be represented by a vector angularly disposed from the vector C by 120 degrees in clockwise rotation. But, as shown in Figs. 3 and 4, the electrical connections of the coil 2 are reversed which, in turn, cause a displacement of 180 degrees in a counter clockwise rotation of the vector representing the self-induced electromotive force of the coil 2. Therefore, the vector B, in Figs. 5 and 6, represents the self-induced electromotive force in the coil 2. Inasmuch as coils 1 and 4 are reversely connected and inserted in series relation with a single conductor of the system, the vectors $\frac{A_1}{2}$ and $\frac{A_2}{2}$ represent, respectively, the self induced electromotive forces of the coils 1 and 4. As shown, these last named vectors are displaced 60 degrees, respectively, from the vectors B and C.

In Fig. 6, the vectors of Fig. 5, which represent the self-induced electromotive forces in the various coils, are shown in combination with the vectors which represent the electromotive forces induced in the coils by reason of their peculiar disposition. The vector D would represent the self-induced electromotive force of the coil 2 if the electrical connections thereof were not reversed, as heretofore mentioned. Attention may now be had to the vector C in combination with the vectors representing the electromotive forces induced in the coil 3. Vector E, which is in phase with vector $\frac{A_2}{2}$, represents, by its length and position, the electromotive force induced in the coil 3 by the coil 4. The vector F, which is displaced 120 degrees in a counter-clockwise direction from the vector E, represents the electromotive force induced in the coil 3 by the coil 2. The resultant G of the vectors E and F is added positively to the vector C and is in phase relationship therewith. The resultant electromotive force induced in the coil 3 is, therefore, represented in value and phase by the arithmetical sum of the vectors C and G. Similarly, the resultant electromotive force induced in the coil 2 is represented by the arithmetical sum of vectors B and H, the latter being the resultant of the electromotive forces induced in the coil 2 by the coils 1 and 3. Inasmuch as coils 1 and 4 are each adjacently disposed and mutually inductively related to single coils 2 and 3, respectively, the resultant electromotive force, by reason of the self-induction of the coils 1 and 4 and the mutual induction between the coils 1—2 and the coils 3—4, is represented by the vector I, which is displaced 120 degrees from the vector C and is equal in length to the sum of the vectors C—G and also to the sum of the vectors B—H. From the above description, it will be noted that the phase angle between the electromotive force in the coil 2 and that in the coil 3, as well as the phase angle between the electromotive force in the coil 2 and that in the coils 1 and 4, in conjunction, is 60 degrees while the phase angle between the electromotive force in the coils 1 and 4, in conjunction, and that in the coil 3 is 120 degrees.

Since the currents flowing in the three-phase mains are displaced from each other, in phase, by 120 degrees and the reactance offered to the current flow by the coils severally connected in series with the mains is displaced 90 electrical degrees from the current, the impressed electromotive forces are maintained in balanced relation and equal in value.

In Fig. 7, I have shown a modification of the coil of Fig. 1, the coils 14 and 15 corresponding to the coils 2 and 3 of Fig. 1, and the coils 16 and 17 corresponding, respectively, to the coils 1 and 4. By so winding the coils 14 and 15 as to have a greater diameter than that of the coils 16 and 17, and by concentrically disposing all of the coils as shown, the over-all length of the coil of Fig. 1 may be decreased. It will be seen that the mutual inductions between the various coils may be regulated and varied by giving the coils the proper numbers of convolutions and spacing them the proper distances from one another. In all cases, it is desired to have the resultant reactances offered by the different coils equal in value and properly displaced from one another in order to effect no unbalancing of the system.

While I have herein shown and described several embodiments of my invention, it will be understood by those skilled in the art that various modifications may be made without departing from the spirit and scope of my invention, and I desire that only such limitations shall be imposed as are indicated in the appended claims.

I claim as my invention:

1. The combination with a plurality of conductors comprising a polyphase system, of reactance coils therefor which are so positioned with respect to one another as to be mutually inductively related, one of said conductors being connected in circuit with a plurality of said coils, and each of the other conductors being connected in circuit with a single coil, a coil associated with said first conductor being disposed immediately adjacent to one of the other of said coils.

2. The combination with a plurality of conductors for polyphase currents, of power-limiting reactance coils therefor which are so disposed with respect to one another as to be mutually inductively related, one of said conductors being connected in circuit with a plurality of said coils, each of which is mutually inductively related to one of the coils singly connected in circuit with the other of said conductors.

3. The combination with a plurality of conductors for polyphase currents, of power-limiting reactance coils therefor which are so disposed with respect to one another as to be mutually inductively related, one of said conductors being connected in series circuit with a plurality of said coils, and each of the other conductors being connected in series circuit with a single coil which is inductively related to a single coil in circuit with one of said other conductors, and to one of the coils inserted in said first conductor.

4. The combination with a plurality of conductors for polyphase currents, of power-limiting reactance coils therefor which are superposed upon, and spaced from, one another in order to be mutually inductively related, one of said conductors being connected in series circuit with the upper and lower coils, and each of the other of said conductors being connected to an intermediate coil.

5. The combination with a plurality of conductors for polyphase currents, of power-limiting reactance coils therefor which are so superposed upon one another as to be mutually inductively related, one of said conductors being connected in series circuit with a plurality of said coils and each of the other conductors being connected in series circuit with a single coil which is interposed between one of the single coils inserted in one of said other conductors and one of the coils inserted in said first conductor.

6. The combination with a plurality of conductors for polyphase currents, of power-limiting reactance coils therefor which are so positioned with respect to one another as to be mutually inductively related, one of said conductors being connected in series circuit with two reversely connected coils and each of the other conductors being connected in series circuit with a single coil which is disposed adjacent to one of said reversely-connected coils in order to be inductively related thereto.

7. The combination with a plurality of conductors for polyphase currents, of power-limiting reactance coils therefor which are so superposed upon one another as to be mutually inductively related, one of said conductors being connected in series circuit with two electrically reversely-connected coils and each of the other conductors being connected in series circuit with a single coil which is interposed between one of said reversely-connected coils and one of the single coils connected in circuit with one of said other conductors.

8. The combination with a plurality of conductors for polyphase currents, of power-limiting reactance coils therefor which are so superposed upon one another as to be mutually inductively related, one of said conductors being connected in series circuit with two electrically reversely-connected coils and each of the other conductors being connected in series circuit with a single coil, the said single coil being electrically reversely-connected with respect to each other and interposed between the reversely-connected coils in said first conductor.

9. A three-phase reactance coil comprising four coil-units, the said coil units being so superposed upon one another as to be mutually inductively related, two of said coils being electrically reversely connected in series circuit with one of the distributing conductors of the system, and the other coil units, which are associated with the remaining conductors, being interposed between the said first two coil units.

10. A three-phase reactance coil comprising four coil-units which are so superposed upon one another as to be mutually inductively related, two of said coil units being electrically reversely connected in series circuit with one of the distributing conductors of a polyphase system, and the other two coil-units, which are associated with remaining conductors, being electrically reversely connected with respect to each other and interposed between the said first two coil units.

11. A three-phase reactance coil comprising four coil units which are disposed adjacent to one another, two of said coil units being electrically reversely connected in series circuit with one of the distributing conductors of a polyphase system, and the other two coil units associated with remaining conductors being electrically reversely connected to effect a phase displacement of 60 degrees of their respective self-induced electromotive forces.

12. A three-phase reactance coil comprising four coil units, two of which are electrically reversely connected in series circuit with one of the distributing conductors of a polyphase system, and the other two coil units associated with remaining conductors being electrically reversely connected to effect a phase displacement of 60 degrees of their respective self-induced electromotive forces, each of last said coil units being so disposed adjacent to one of first said coil units as to be inductively related thereto.

13. A three-phase reactance coil comprising four coil units so positioned with respect to one another as to be mutually inductively related, two of which are electrically reversely connected in series circuit with one of the distributing conductors of a polyphase system, and the other two coil units associated with remaining distributing conductors being electrically reversely connected to effect a phase displacement of 60 degrees of their respective self-induced electromotive forces, each of last said coil units being so disposed as to be mutually inductively related to each other and to one of said first coil units.

14. A three-phase reactance coil comprising four-coil units so superposed upon one another as to be mutually inductively related, the upper and lower coil units being electrically reversely connected in series circuit with one of the distributing conductors of a polyphase system, and the intermediate coil units associated with remaining distributing conductors being electrically reversely connected to effect a phase displacement of 60 degrees of their respective self induced electromotive forces, the last said coil units being interposed between the first said coil units.

In testimony whereof, I have hereunto subscribed my name this 25th day of June 1914.

JOHN F. PETERS.

Witnesses:
WALTER M. DANN,
B. B. HINES.